(12) United States Patent
Chauval et al.

(10) Patent No.: US 11,310,168 B2
(45) Date of Patent: *Apr. 19, 2022

(54) ACTIVITY BASED ELECTRICAL COMPUTER SYSTEM REQUEST PROCESSING ARCHITECTURE

(71) Applicant: NEX Services North America LLC, New York, NY (US)

(72) Inventors: Jason Chauval, London (GB); Christopher Freedlander, London (GB); David J. Lyons, Westport, CT (US)

(73) Assignee: NEX Services North America LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/244,363

(22) Filed: Apr. 29, 2021

(65) Prior Publication Data

US 2021/0266270 A1  Aug. 26, 2021

Related U.S. Application Data

(63) Continuation of application No. 16/588,036, filed on Sep. 30, 2019, now Pat. No. 11,025,562, which is a
(Continued)

(51) Int. Cl.
*H04L 47/70* (2022.01)
*H04L 67/61* (2022.01)
*G06Q 40/04* (2012.01)

(52) U.S. Cl.
CPC .......... *H04L 47/821* (2013.01); *H04L 67/322* (2013.01); *G06Q 40/04* (2013.01)

(58) Field of Classification Search
CPC ....... H04W 4/029; H04W 4/021; H04W 4/02; H04W 12/06; H04W 12/63;
(Continued)

(56) References Cited

U.S. PATENT DOCUMENTS

5,136,501 A  8/1992 Silverman
5,375,055 A  12/1994 Togher
(Continued)

*Primary Examiner* — Michael A Keller
*Assistant Examiner* — Thao D Duong
(74) *Attorney, Agent, or Firm* — Lempia Summerfield Katz LLC (57) ABSTRACT

An electrical computer system processing architecture for providing an indication of activity in the electrical computer system, the electrical computer system processing architecture comprising a plurality of client computers connected to at least one server by a computer network. Each of the client computers is configured to provide requests to the at least one server. The or each server comprises a store for storing requests provided by the plurality of client computers. The or each server is configured to match complementary requests from the plurality of client computers stored in the store. Following the matching of complementary requests, the or each server counts unmatched requests corresponding to one or other of the complementary requests in the store, and outputs the counted number of unmatched requests to provide the indication of activity in the computer system.

23 Claims, 6 Drawing Sheets

Related U.S. Application Data continuation of application No. 15/450,428, filed on Mar. 6, 2017, now Pat. No. 10,469,409.

(60) Provisional application No. 62/304,415, filed on Mar. 7, 2016, provisional application No. 62/304,505, filed on Mar. 7, 2016.

(58) Field of Classification Search
CPC ........... H04W 12/033; H04W 12/0431; H04W 12/0433; H04W 12/0471; G06Q 20/3224; G06Q 10/083; G06Q 10/06316
See application file for complete search history.

(56) References Cited

U.S. PATENT DOCUMENTS

| | | | |
|---|---|---|---|
| 7,184,982 B1 | 2/2007 | Howorka | |
| 2004/0064420 A1 | 4/2004 | Buist | |
| 2006/0041500 A1 | 2/2006 | Diana | |
| 2007/0149214 A1* | 6/2007 | Walsh | H04L 67/18 455/456.1 |
| 2013/0047199 A1* | 2/2013 | Radhakrishnan | G06F 21/34 726/1 |
| 2013/0047202 A1* | 2/2013 | Radhakrishnan | H04L 63/10 726/1 |
| 2014/0304342 A1* | 10/2014 | Shekhar | H04L 51/20 709/206 |
| 2015/0097026 A1 | 4/2015 | Lu | |
| 2017/0039639 A1 | 2/2017 | Singer | |
| 2017/0272549 A1* | 9/2017 | Chauval | H04L 67/322 |
| 2018/0295120 A1* | 10/2018 | Dawson | H04L 63/0884 |
| 2018/0349800 A1* | 12/2018 | Saba | H04L 67/306 |
| 2019/0305955 A1* | 10/2019 | Verma | H04L 9/3247 |

* cited by examiner

ACTIVITY BASED ELECTRICAL COMPUTER SYSTEM REQUEST PROCESSING ARCHITECTURE

CROSS-REFERENCE TO RELATED APPLICATIONS

The present application is a continuation of U.S. application Ser. No. 16/588,036, filed Sep. 30, 2019 entitled "Activity Based Electrical Computer System Request Processing Architecture," now U.S. Pat. No. 11,025,562, which is a continuation of U.S. application Ser. No. 15/450,428, filed Mar. 6, 2017 entitled "Activity Based Electrical Computer System Request Processing Architecture," now U.S. Pat. No. 10,469,409, which claims the benefit of U.S. Patent Application No. 62/304,415, entitled "Electrical Computer System Processing Architecture", filed Mar. 7, 2016 and U.S. Patent Application No. 62/304,505, entitled "Electrical Computer System Processing Architecture", filed Mar. 7, 2016, all of which are incorporated herein by reference in their entirety and relied upon.

FIELD OF THE INVENTION

The present invention relates to an electrical computer system processing architecture and, in particular, an electrical computer system processing architecture that provides an indication of activity in the electrical computer system.

BACKGROUND OF THE INVENTION

Today's computer systems typically include many different computers such as servers and general purpose personal computers (such as, desktop and laptop computers) acting as clients that are connected to the servers on a computer network. The servers provide resources to the clients. A server of this distributed architecture can provide resources to clients, on each client's request, around the world and therefore in different time zones. As clients for a server may be in different time zones, users can be expected to request resources from servers at varying times particularly as the working day varies across the globe.

BRIEF SUMMARY OF THE INVENTION

Embodiments of the present invention solve the technical problem of providing an accurate indication of activity in the computer system and, in particular, in a complex computer system involving many client computers connected to a server on a computer network.

The invention in its various aspects is defined in the independent claims below to which reference should now be made. Advantageous features are set forth in the dependent claims.

Arrangements are described in more detail below and take the form of an electrical computer system processing architecture for providing an indication of activity in the electrical computer system, the electrical computer system processing architecture comprising a plurality of client computers connected to at least one server by a computer network. Each of the client computers is configured to provide requests to the at least one server. The or each server comprises a store for storing requests provided by the plurality of client computers. The or each server is configured to match complementary requests from the plurality of client computers stored in the store. Following the matching of complementary requests, the or each server counts unmatched requests corresponding to one or other of the complementary requests in the store, and outputs the counted number of unmatched requests to provide the indication of activity in the computer system.

Example arrangements are simple and computationally efficient yet accurate.

In an aspect of the present invention, there is provided an electrical computer system processing architecture for providing an indication of activity in the electrical computer system, the electrical computer system processing architecture comprising: a plurality of client computers being connected to at least one server by a computer network; each of the client computers being configured to provide requests to the at least one server; the or each server comprising a store for storing requests provided by the plurality of client computers, the or each server being configured to: match complementary requests from the plurality of client computers stored in the store, following matching of complementary requests, count unmatched requests corresponding to one or other of the complementary requests in the store, and output the counted number of unmatched requests to provide the indication of activity in the computer system.

In another aspect of the present invention, there is provided a server forming part of an electrical computer system processing architecture, the server for providing an indication of activity in the computer system, the server comprising: a store for storing requests provided by a plurality of client computers, and the server being configured to: match complementary requests from the plurality of client computers stored in the store, following matching of complementary requests, count unmatched requests corresponding to one or other of the complementary requests in the store, and output the counted number of unmatched requests to provide the indication of activity in the computer system.

In another aspect of the present invention, there is provided a computerized method for providing an indication of activity in a computer system, the computerized method comprising: a server of the computer system receiving requests from a plurality of client computers connected to the server by a computer network; each of the client computers being configured to provide requests to the at least one server; the server storing the requests provided by the plurality of client computers; the server matching complementary requests from the plurality of client computers stored in the store; following matching of complementary requests, the server counting unmatched requests corresponding to one or other of the complementary requests in the store; and outputting the counted number of unmatched requests to provide the indication of activity in the computer system.

In a yet further aspect of the present invention, there is provided a computer readable medium comprising instructions for carrying a method on a server for providing an indication of activity in a computer system, the computerized method comprising: receiving requests from a plurality of client computers connected to the server by a computer network; each of the client computers being configured to provide requests to the at least one server; the server storing the requests provided by the plurality of client computers; the server matching complementary requests from the plurality of client computers stored in the store; following matching of complementary requests, the server counting unmatched requests corresponding to one or other of the complementary requests in the store; and outputting the counted number of unmatched requests to provide the indication of activity in the computer system.

The requests may be provided in XML format. Complementary requests may be matched by time priority provided by the plurality of client computers.

One example of a type of computer system where it is very useful to know the activity of the computer system is an electronic trading system and, in particular, an anonymous trading computer system. These are highly complex computer systems with many components.

The inventors of the present application are the first to appreciate that activity in an electronic trading system may be linked to a central limit order book quote count rather than a deal or trade count. A deal or trade count is where an order or quote has actually been matched. In contrast, embodiments of the present invention count unmatched quotes or orders in an order book.

Embodiments of the present invention provide the technical advantage of neutralizing technology advantages of traders. For example, algorithmic traders or computerized traders with quick communications do not have an advantage.

In examples of the present arrangement, products such as financial products are linked (for example, from EBS Brokertec platforms) using dynamically calculated post trade time intervals, referencing unique anonymous and disclosed markets (such as EBS Markets) central limit order book's (CLOB) quote counts as a reference point. Frequency of quote update in the CLOB is used. This measurement reflects market activity and volatility, which is directly aligned with the risk holding periods for electronic trading desks at banks.

The inventors of the present application have appreciated that the time it takes to receive a predetermined number of orders in a CLOB reflects the activity of the market/product in general, better than counting deal time, price volatility or price update frequencies from aggregated price makers. The inventors of the present application have appreciated that the reason for this is that the order received is an intention to trade or, in other words, an invitation to trade. They have appreciated that an individual price stream from a bank or an aggregated price stream, for example an electronic streaming price (ESP) may vary its pace of activity, but its reasonably constant during the day and reflects many factors outside the core product's price activity. The inventors have appreciated that a collection of orders making up a CLOB is a unique ecosystem and that the time it takes to reach a certain order count is unique to a central limit order book market.

This method described links transactions to the unique activity of the underlying market at the time of dealing. In slow markets, calculation periods will be longer and in fast market conditions in currencies/products like EURUSD, could be as short as a few seconds.

Products use different time periods for each trade thereby making the calculations much more relevant and reflective of the risk holding periods at the banks and other participants.

In an aspect of the present invention, there is provided a computer system for providing an indication of activity in an electronic trading system, the computer system comprising: a plurality of order input devices connected to at least one matching engine by a computer network; each of the order input devices being configured to submit orders to the matching engine; the matching engine being configure to store orders in an order book submitted by the order input devices and to match complementary orders submitted by the order input devices, the matching engine being configured to: following matching of complementary orders, count unmatched orders corresponding to one or other of the complementary orders stored in the order book, and output the counted number of unmatched orders to provide the indication of activity in the computer system.

In another aspect of the present invention, there is provided a matching engine for providing an indication of activity in an electronic trading system, the matching engine being configured to store orders in an order book submitted by order input devices and to match complementary orders submitted by the order input devices, the matching engine being configured to: following matching of complementary orders, count unmatched orders corresponding to one or other of the complementary orders stored in the order book, and output the counted number of unmatched orders to provide the indication of activity in the computer system.

In another aspect of the present invention, there is provided a method of providing an indication of activity in an electronic trading system, the method comprising: a plurality of order input devices submitting orders to at least one matching engine of the electronic trading system by a computer network; the matching engine storing, in an order book, the orders submitted by the order input devices and matching complementary orders submitted by the order input devices, following matching of complementary orders, the matching engine counting unmatched orders corresponding to one or other of the complementary orders stored in the order book, and outputting the counted number of unmatched orders to provide the indication of activity in the electronic trading system.

The order book may be a CLOB. The orders may be limit orders. A limit order is an order to buy or sell at a specified price or better. A limit order may not be executed if the price set cannot be met during the time it is open. The orders may be provided in XML format The orders may be matched in price/time priority where the time is the time the orders are submitted by an order input device or terminal.

A computer readable medium, such as a CD-ROM, DVD-ROM or USB flash drive, may be provided comprising instructions for carrying out the method described above on a computer.

BRIEF DESCRIPTION OF THE DRAWINGS

The invention will be described in more detail, by way of example, with reference to the accompanying drawings, in which.

Like features in the Figures have been given like reference numerals.

DETAILED DESCRIPTION OF THE INVENTION

Figure 1:
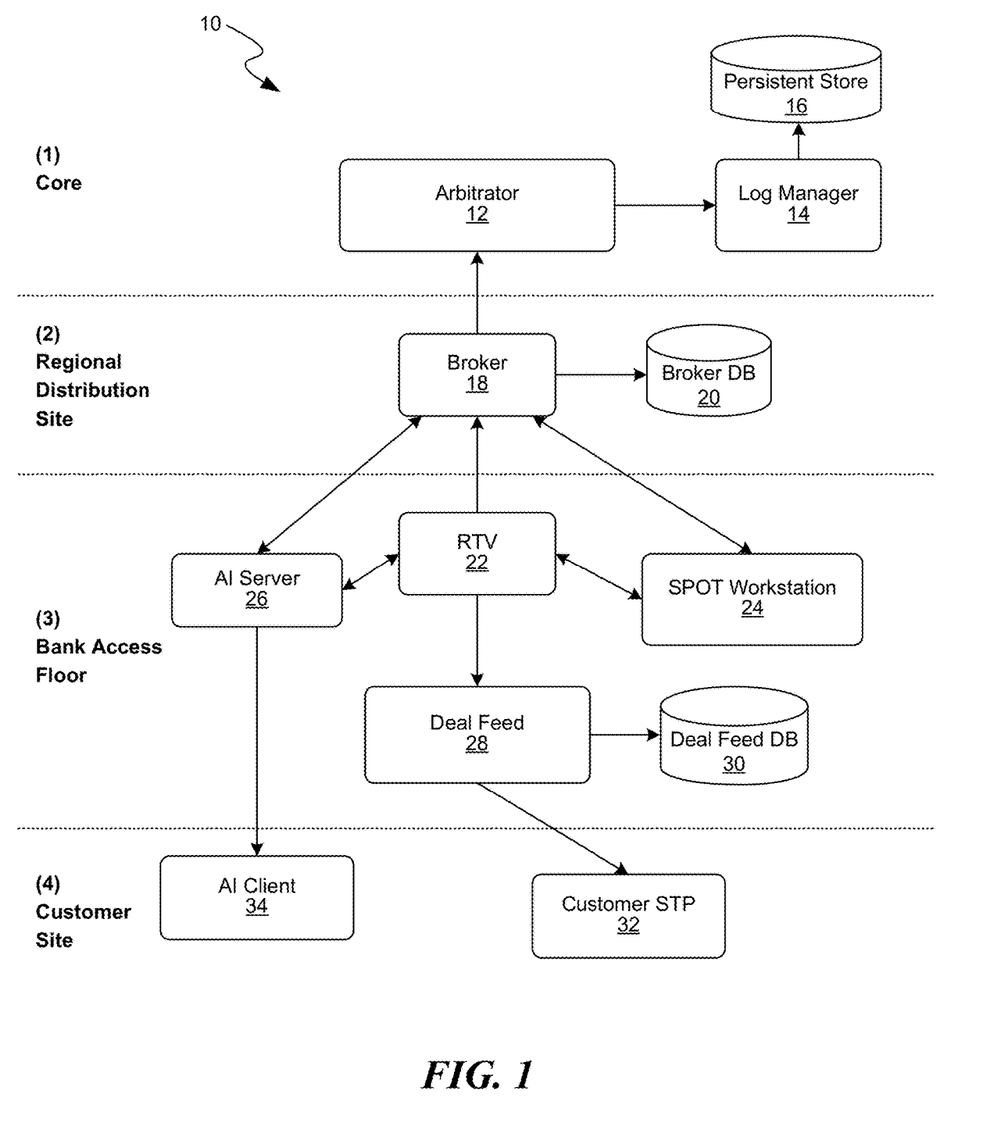
FIG. 1 is a schematic view of an electrical computer system processing architecture embodying an aspect of the present invention.

An electrical computer system processing architecture for providing an indication of activity in the computer system is illustrated in FIG. 1. The computer system comprises at least one server in the form of an arbitrator computer or matching engine 12 and a plurality of client computers in the form of broker computers or order input devices 18 that are connected to the at least one server by a computer network.

In this example, the computer system takes the form of an anonymous trading computer system. These types of computer system are widely used to trade fungible instruments, particularly financial instruments such as foreign exchange (FX) products. These systems have been very successful and are used for the majority of transactions in some instruments, for example spot FX.

As their name suggests, anonymous trading systems do not allow the participants to know the identity of potential counterparties to a transaction until the trade has been confirmed. One well known system, the EBS platform, described in U.S. Pat. No. 5,375,055 incorporated herein by reference requires traders to input quotes in the forms of bids and offers into the system via their trader terminals. Quotes or orders have a price and an amount or size. These quotes are matched with other quotes in the system by a matching engine or arbitrator. Where a match is found, a deal will be executed between the parties, once it has been established that each party has sufficient credit with the other for the deal. A market distributor is arranged between the arbitrator and a bank node, at which is a credit matrix indicative of credit relationships assigned by a bank to all counterparties on the system. The market distributor is responsible for constructing a market view for each trading floor based on their credit as represented by the binary credit matrix stored at the market distributor. Thus, traders at a given trading floor are only shown quotes input into the system by parties with whom they have credit. In this platform, the actual credit limits are stored at bank nodes.

Once a deal has been concluded, details of the trade, including the identity of the parties and the price at which the deal was concluded, are distributed to all trading floors. Thus, the system is no longer anonymous once deals have been completed.

In this platform, visible quotes are matched with other quotes in the system by the matching engine or arbitrator in price/time priority. That is to say, when two or more parties submit an invisible order in response to a visible order, quotes with the best price are matched first, if there are two or more quotes at the same price, they are matched in time input into the system priority (the first order received is matched).

Increasingly, so called algorithmic or algo traders are traded on trading systems of this type together with human traders. Algo traders are programmed computers that react to market conditions to submit orders into the trading system. They can react much quicker than a human trader and so will generally be able to respond to changes in market data and respond more quickly in terms of order entry or cancel than human traders.

The computerized method and computer system is suitable for implementation on any credit screened electronic, computerized trading system or anonymous trading system for trading fungibles in the form of financial instruments such as foreign exchange products and, in particular, spot FX. Various examples exist in the prior art of such systems, including that of European patent application publication No. EP0399850 of Reuters Ltd, which discloses a centralized host system in which traders communicate via trader workstation computers with a host computer which holds credit, performs order matching and executes deals. U.S. Pat. No. 5,375,055 mentioned above discloses a distributed matching system in which matching takes place at arbitrator computers but actual credit limits are held at bank node computers through which trader workstations communicate with the system. A yes/no credit matrix is stored at market distributor computers arranged between the bank nodes and the arbitrators and which are responsible for credit filtering of quotes on the basis of the credit matrix and for the formation and distribution of market views to trading floors. A further example is disclosed in international patent application with publication No. WO01/98960 which describes a distributed system using a network of broking node computers in which each broking node computer combines matching, market distribution and deal execution functionality. Hybrid systems also exist in which the broking node computer concept is incorporated into the distributed system of U.S. Pat. No. 5,375,055. Such a trading system 10 system is shown in FIG. 1 in which trading functionality is allocated to several progressively distributed tiers. Tiers 1 through 3 reside on the trading system provider network. Tier 4 represents the customer's or traders' own trading infrastructure.

Broadly, in this anonymous trading system traders input quotes in the forms of bids and offers into the system via their trader terminals. Quotes have a price and an amount or size. These quotes are matched with other quotes in the system by a matching engine or arbitrator. Where a match is found, a deal will be executed between the parties, once it has been established that each party has sufficient credit with the other for the deal. A hardware component referred to as a broker sits or is located between the arbitrator and a dealing floor, at which sits or is located a credit matrix representing the bi-lateral credit relationships (granted and received) of a bank with each counterparty on the system. The broker is responsible for constructing a market view for each trading floor (deal code) based on their bi-lateral credit relationships as represented by the binary credit matrix stored at the broker. Thus, traders at a given trading floor are only shown quotes input into the system by parties with whom they have credit. In this platform, the actual credit limits are stored at the broker.

Once a deal has been concluded, details of the trade, including price, size and counterparty details are exchanged between counterparties to the trade. Only counterparties to a trade are informed of size and counterparty name but the rate at which the trade took place will be included within a market data feed, in this example, EBS Market Data including paid, given, highs, and lows and this is published more widely and available to other traders.

In this platform generally, visible quotes are matched with other quotes and/or hits (referred to as buys/sells or IOCs (immediate or cancel)) in the system by the matching engine or arbitrator. In examples of the present invention operating on this platform, in some circumstances, visible quotes are matched with other quotes and/or hits by the matching engine or arbitrator in price/time priority.

In price/time priority, when two or more parties submit orders in an attempt to match a visible order, quotes with the best visible price are matched first, if there are two or more quotes at the same price, they are matched in time input into the system priority (the first order received is matched).

In more detail, in the electronic trading system or electrical computer system processing architecture 10 of FIG. 1, Tier 1 or the core hosts the matching engines, or arbitrators 12 each provided as a resource on a server. These are each a single computer or group of computers on a network. In this example, only one arbitrator is shown for simplicity. However, in practice, three arbitrators are used one in each major trading center of Europe (London), America (New York) and Asia (Tokyo). The arbitrators have a global view of the market, facilitating global liquidity. This tier also supports centralized transactional persistence and analysis using log manager 14 and persistent store 16. Again, this is a computerized process with the functionality being carried out by one or more computers on a network. The arbitrators are constantly synchronized, so that quotes submitted in a single region are instantly available globally. Thus, servers in each country can expect to see varying activity throughout the day in which the server is located as trading days in the different countries happen. A peak in activity can broadly be expected when more than one trading day in the major trading centers is happening.

The primary roles of an arbitrator or matching engine 12 are to maintain the global order book and credit books for its region, propose deals by matching credit compatible orders and quotes and distribute market data to other arbitrators and downstream computerized components. In particular, the matching engine matches maker quotes in an order book with takes. The quotes and takes are input by trader input devices as described further below.

Transactions from each arbitrator are synchronously persisted in redundant log files. This guarantees that no transactional data is ever lost. Transactional data is also passed in real time to the market data subsystem (formed of one or more computers on a network) for analysis and archiving.

The arbitrator computer or matching engine 12 communicates with brokers or computerized brokers 18. Each broker is formed of one or more computers on a network. Only a single broker is shown in FIG. 1 for simplicity. In practice, a plurality of brokers are provided. The brokers are housed in tier 2 or regional distribution site. The brokers manage the interaction between the trading workstations or trader input devices or clients of tier 3 (described below) and the core of tier 1 described above. Each broker represents a group of trading floors on which the trader input devices reside to the core. The broker's database 20 (run on one or more computers on a network) persists the floor-specific configuration settings and deal history.

The brokers are electronic agents which represent a trading floor to the electronic trading system. Trading floor configuration settings, including entitlements, credit limits, and settlement instructions, are persisted in the broker database. The broker disseminates market views and news to its trading floors and manages the lifecycle of orders and deals for its floors. During trade negotiation, the broker handles the fine-grained credit validation and exchange of settlement instructions between counterparty floors.

A single broker represents a group of trading floors in its geographical proximity. In this example, brokers are hosted in one of three regional distribution sites (London, New York, Tokyo).

Tier 3 or the bank access floor hosts a real time view server (RTV) 22, which is a server that resides locally on a bank floor (in practice, it may be implemented by one or more computers on a network). It plays an important role in conserving network traffic and enhancing the speed and scalability of the trading system. As a floor-based server, the RTV performs all the floor-wide services for the trading entities (both spot (manual or human trader) workstations and spot automated trading servers) on its floor. These services include data aggregation, caching, and distribution. The RTV is also responsible for the delivery of completed deal information to the deal feed server on its floor. The RTV may be, for example, deployed as a stand-alone dedicated server or co-hosted on a spot workstation 24 provided in this tier, depending on the volume of transactions handled.

The spot workstation (or trader input device or client in the form of a manual trader controlled input device) 24 is the trading system front-end application that provides spot trading functionality through an intuitive graphical user interface on a display. This functionality includes maker trader input device and taker trader input device functionality. Makers put requests, namely open orders or quotes in the form of bids and offers available to other traders, into the market. Takers hit the orders or quotes put into the market by makers. The quotes include a quote price and a quote size or amount. The manual trader controlled input device or client includes price panels as part of its display that displays both the system-wide "best price" and the credit-screened "dealable best price" for a particular currency. Prices can be hit by takers directly from the price panel. It also includes quote panels that are used to provide requests or, in other words, submit or input a quote in the form of a bid or offer into the trading system.

This tier also includes a spot automated trading server 26 (another type of trader input device, that takes the form of one or more computers on a network) that supports automated trading by exposing an XML interface to the trading system. This too may act both as a maker trader input device and a taker trader input device. The server is an automated trading interface that provides for direct integration between a customer's trading engine and the trading system, thereby enabling model or program trading and the maintenance of a 24-hour order book. Full trading capability is exposed using the XML interface which can be accessed directly by the customer's model applications, which may include: mathematical models, arbitrage models, and risk management models. The server is the component that intermediates between the customer-provided trader input device 24 in the form of a client and the trading system. Architecturally, the server is similar to a workstation, except that whereas a workstation intermediates between a graphical user interface on a display and trading messages, the server translates from XML messaging protocol to the trading messages. Also similar to a workstation, the server performs the tasks of user authentication and input validation. XML messages are validated both for conformance to the XML protocol and for compliance with trading system dealing rules.

This tier also hosts a computerized deal feed system 28 (in the form of one or more computers on a network) that provides a feed of completed deal information for straight through processing (STP); it automates the delivery of post-deal information including delivering completed deal tickets to a deal feed database 30 run on one or more computers.

Finally, tier 4 on the customer site on the customer network, includes processes outside the trading system provider firewall, including, in this example, customer STP processors 32 (provided by one or more computers on a network) and an automated trading client 34 (provided by one or more computers on a network).

The automated trading client or Ai client 34 is any customer managed application that communicates with the Ai server through the trading system XML protocol. The clients may be written in, for example, Java, C++, Microsoft Excel, or any language that can create XML messages conforming to the trading system protocol.

Embodiments of the present invention are not limited to any particular architecture and may be implemented on the system described above and on other systems. While XML is described as an example of the messaging protocol used, other messaging protocols could be used.

The servers in the form of matching engines or arbitrators 12 of embodiments of the present invention maintain the order book.

Broadly, the server forms a central limit order book (CLOB) quote count product model (CLOB QC) that creates and utilizes dynamically calculated post trade time intervals based on a count of unique quotes entered into the CLOB. This measurement reflects market activity and volatility which is directly aligned with the risk holding periods for electronic trading desks at banks. In turn, these dynamic time intervals are used by other products of the trading system (such as EBS Brokertec products) to mark to market the value of trades a predetermined time (generally, of the order of seconds) after conception. Such a CLOB quote count model is available to the owner of a CLOB only. Mark to market reflects the current market value.

Figure 2:
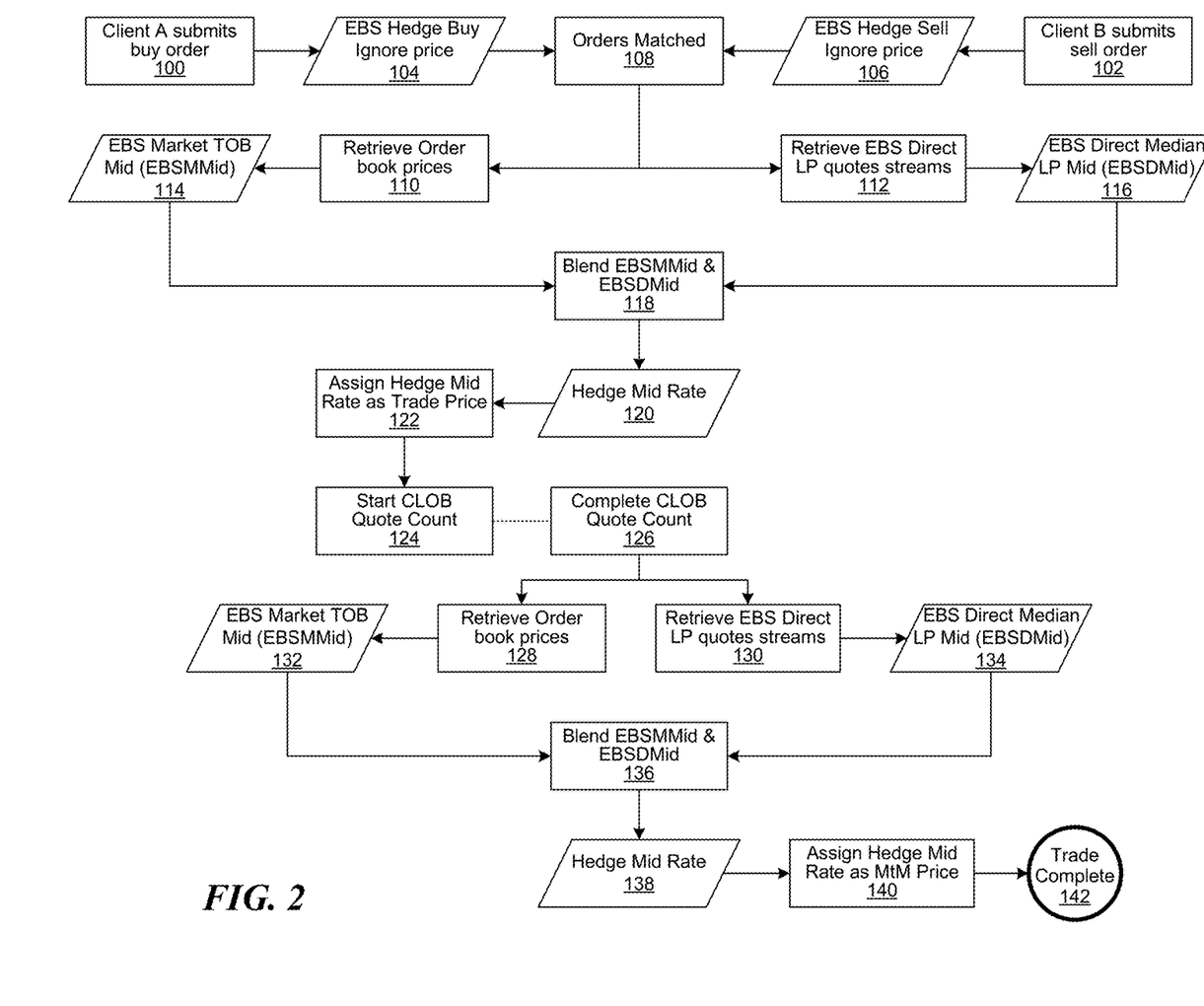
FIG. 2 is a flow diagram illustrating the method implemented by the electrical computer system processing architecture of FIG. 1.

Referring to FIGS. 1 and 2, for order or request matching, client floor codes are assigned to new Ai instances or servers 26 that will in turn be connected to Broker 18. Ai Clients 34 submit standard good 'til cancelled (GTC) orders, which may be complementary orders or requests such as buy 100 or sell 102 orders to the Ai instance. Preferably, clients submit zero prices for transparency. However, any prices applied on both the buy 104 and sell 106 side. All orders are subjected to configurable minimum quote life (MQL) by pair, with a day 1 setting of 3 seconds. Orders are matched by time priority. Once two orders are matched 108, they are subjected to the credit matrix checks described above.

The match price is derived from a blend of a mid-price from a market with anonymous prices (such as EBS Market) and a mid-price from a market with disclosed prices (such as EBS Direct). The weighting between the mid-prices from the two sources is configured at a per currency pair level. In other words, order book prices are retrieved from an anonymous market 110 and from a disclosed market 112 and a mid-price is calculated from each of these 114,116 and then blended 118 to produce a mid-rate 120. This mid-rate is assigned as a trade price 122.

Figure 3:
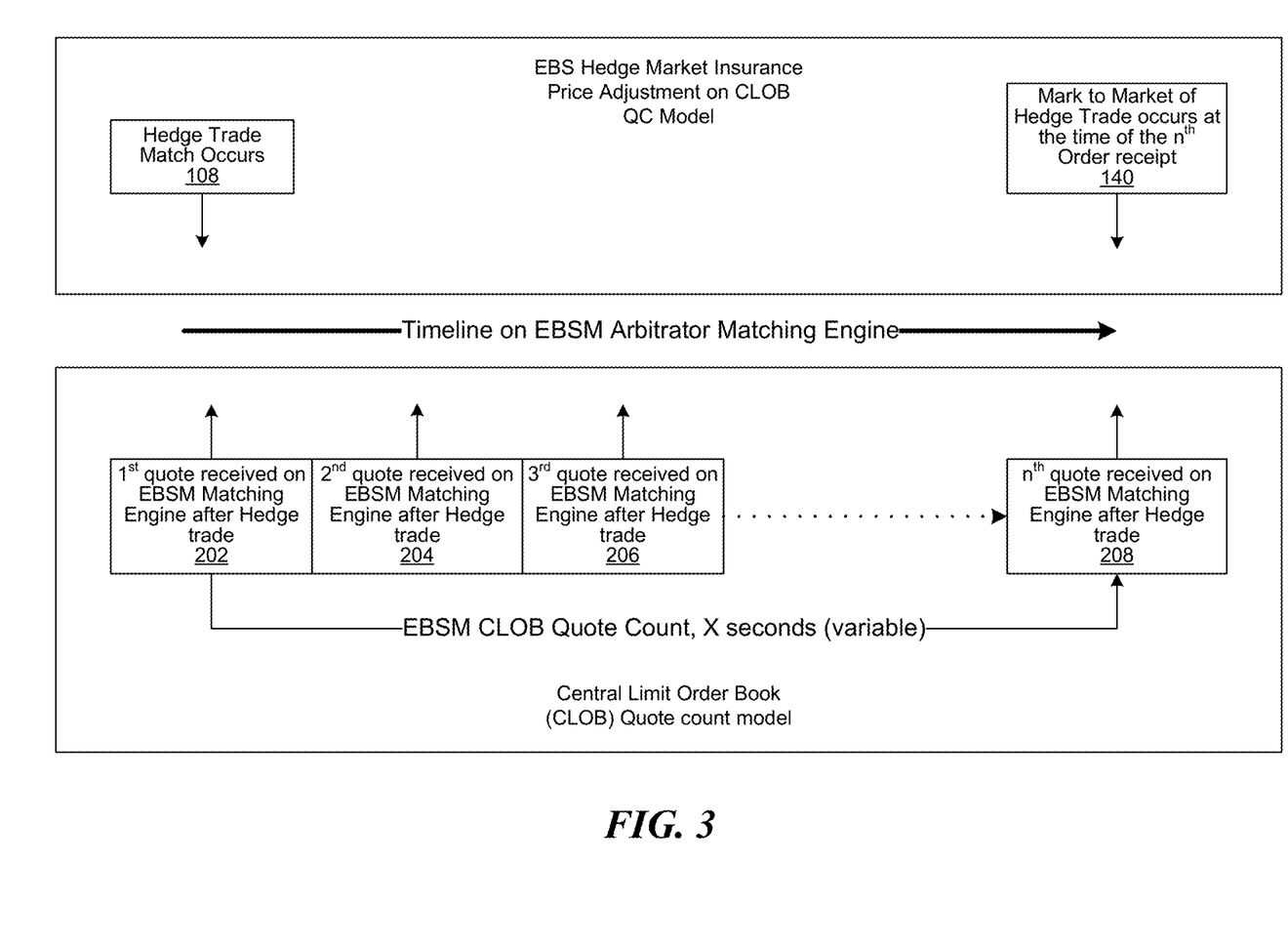
FIG. 3 is a timeline illustrating the method implemented by the electrical computer system processing architecture of FIG. 1.

Once a match occurs, a count is initiated 124 of all unique quotes in the order book of the matching engine for the respective currency pair of the match (this is described in more detail below with reference to FIG. 3) over a predetermined period of time. At the end of the count, when all relevant quotes have been counted 126, a mark to market (MtM) price is then derived. The MtM price is derived by retrieving order book prices from both the market with anonymous prices (such as EBS Market) 128 and the market with disclosed prices (such as EBS Direct) 130, deriving the mid-price of each of these markets 132,134 and then blending them together 136 in the same way that the match price described above is derived. This blended rate forms a mid-rate 138 of the counted quotes and it is this that forms the MtM price 140 completing the process 142.

The count is configurable per currency pair.

As mentioned above, the timeline 200 of FIG. 3 illustrates the count initiated at step 124 of FIG. 2 of all unique quotes in the order book of the matching engine for the respective currency pair of the match. Once the initial match has occurred (the so-called hedge trade), prices of quotes 202, 204, 206, 208 received at the matching engine or server of the currency pair of interest over a predetermined time period of x seconds after the initial match are combined (where x is a number). These form the mid-prices that form the MtM price 140 described above.

Figure 4:
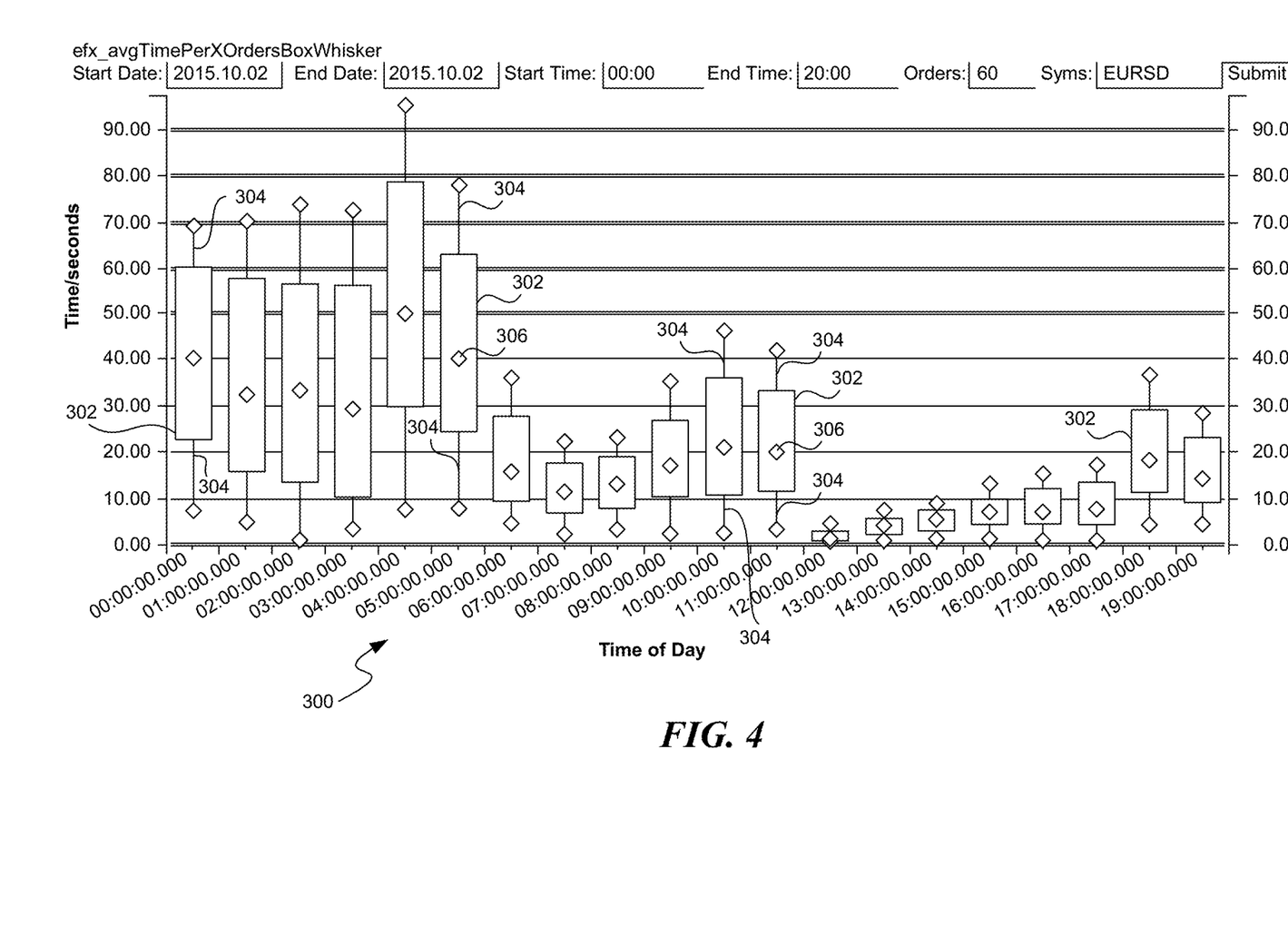
FIGS. 4 to 6 are graphs illustrating the effectiveness of the electrical computer system processing architecture of FIG. 1.

The graph 300 of FIG. 4 illustrates how these time intervals for currency pair EURUSD (Euro to United States dollar) change over the course of a 20 hour trading period (from 20:00-24:00 GMT the markets become very thin and illiquid and are not calculated here). In London/New York cross over (between 12:00-17:00 GMT) when both markets are open, the average time period to reach an order count of 60 takes 5.4 seconds and the range is between 1.5 seconds and 8.2 seconds. The average for the trading day 00:00 GMT to 20:00 GMT is 19.6 seconds and the average range is 1.5 seconds to 50 seconds. The graph of FIG. 4 illustrates that time periods for quote activity vary throughout the course of the trading day.

The graph 300 of FIG. 4 illustrates EBS Markets (a combination of anonymous and disclosed markets) CLOB quote count as a percentile box plot. In this plot, 50% of the time is within each box 302 (only some of the boxes have been given reference numerals for clarity) and whiskers 304 show the 5th and 85th percentiles (only some of the whiskers have been given reference numerals for clarity). The quote count is plotted in seconds per 60 orders and the medians are plotted as boxes 306 (only some of the boxes have been given reference numerals for clarity).

The graph 300 of FIG. 4 illustrates that when data is released at 12.30, the underlying market moves up 1.25% in minutes, from 1.1160 to 1.1300. The CLOB quote count drops from an average time to 60 orders of 20 seconds the hour before to only an average of 1.5 seconds in the following hour.

Figure 5:
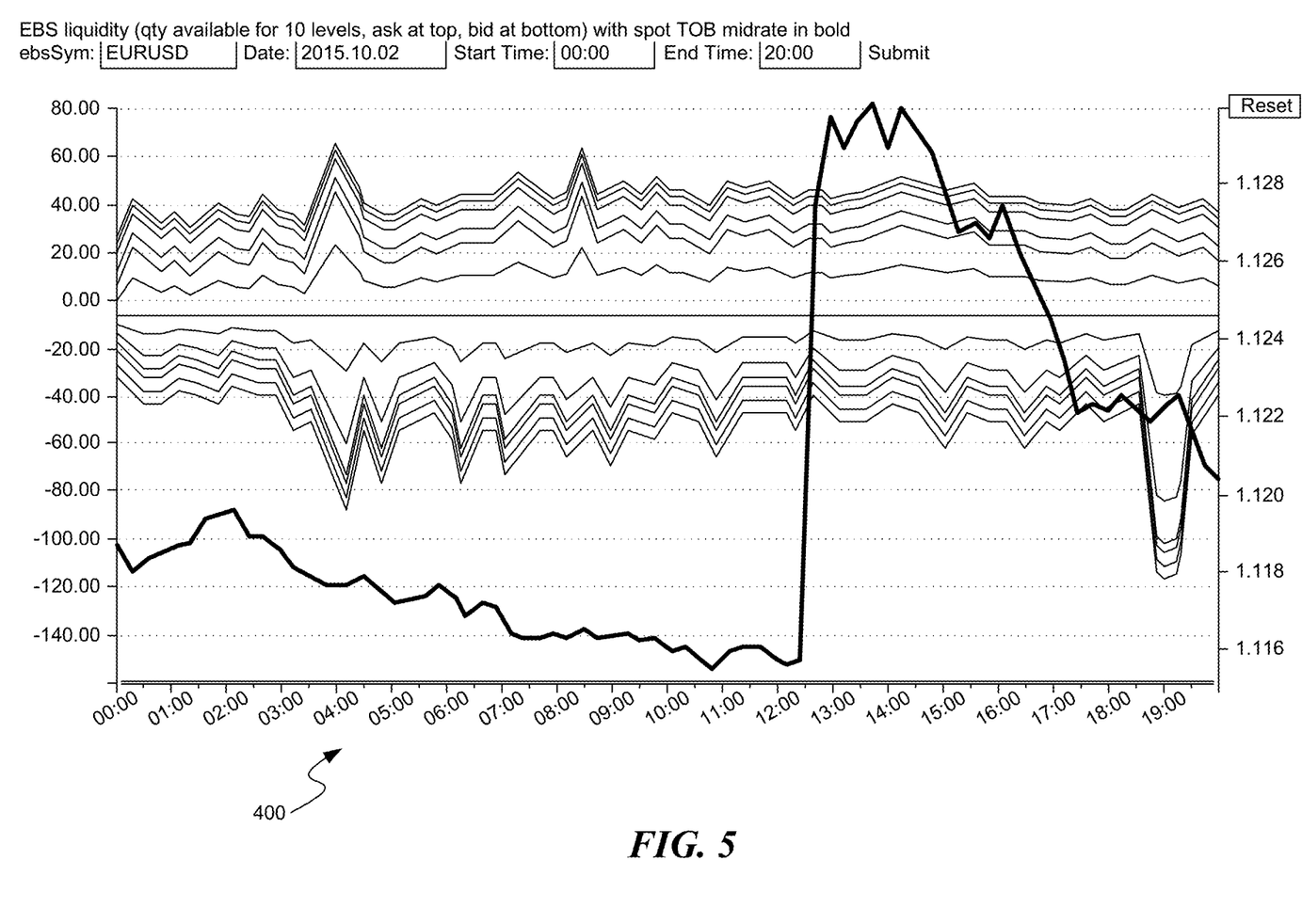

The graph 400 of FIG. 5 illustrates the quantity in Millions EUR for 10 levels of the EBS Markets (a combination of anonymous and disclosed markets) CLOB (ask quotes are at the top, bid quotes are at the bottom, plotted on the left hand axis in millions) 402 and the EBS Markets CLOB EURUSD mid-rate (in white, plotted on right hand side in Percent Per annum price volatility) 404.

Figure 6:
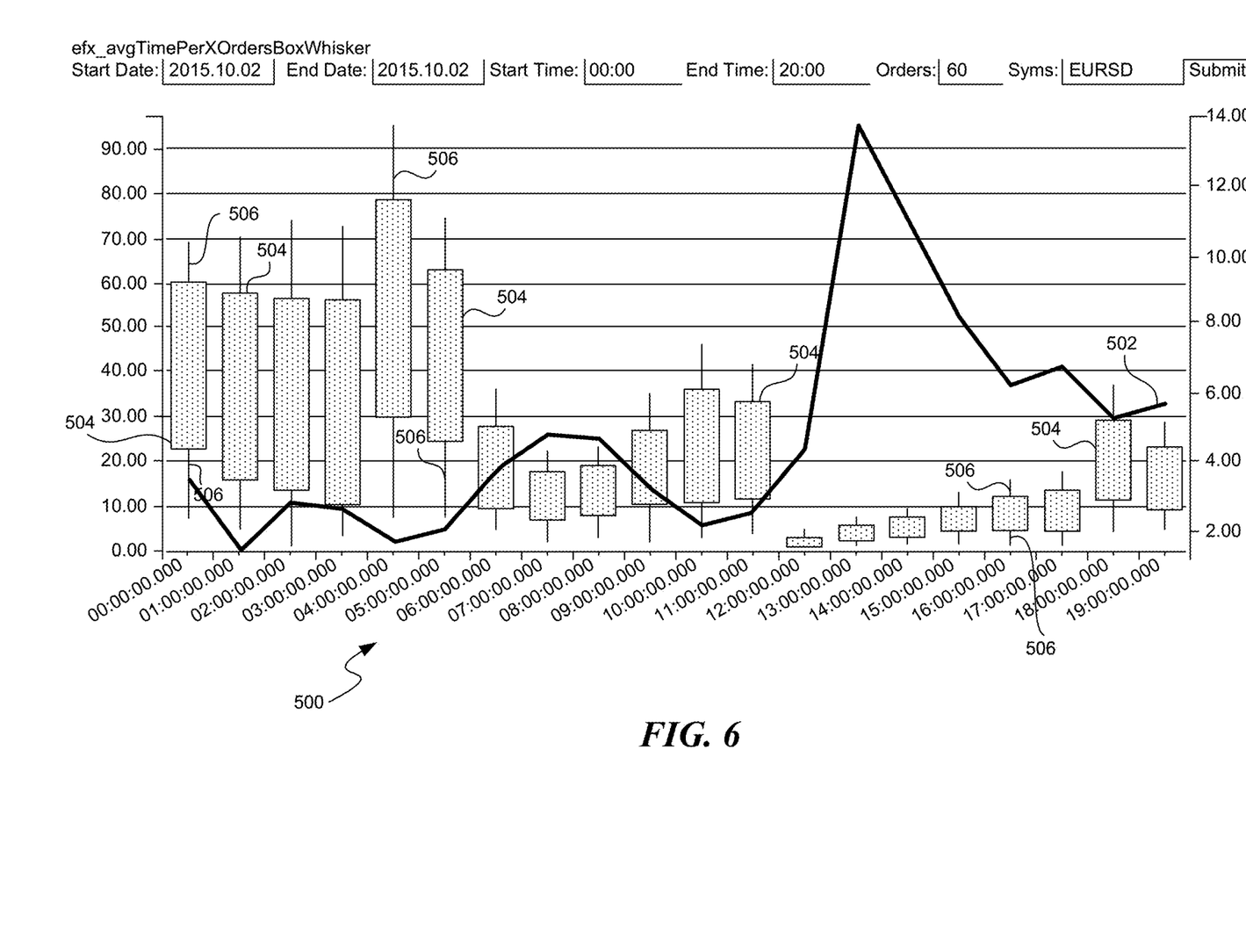

The graph 500 of FIG. 6 is a simple plot of the CLOB quote count versus a standard deviation average of the asset price (502, dark line on graph with scale on the right hand side). The graph of FIG. 6 shows EBS Markets (a combination of anonymous and disclosed markets) CLOB quote count as a percentile box plot with 50% of time within each box 504 (only some of the boxes have been given reference numerals for clarity), whiskers 506 showing 5th and 85th percentiles (only some of the whiskers have been given reference numerals for clarity) plotted in seconds per 60 orders and the time scale is in seconds on left hand axis; and a standard deviation of the EBS Markets CLOB EURUSD mid-rate (502, dark line plotted on right hand side in percent per annum price volatility).

The graph 500 of FIG. 6 shows how the CLOB quote count is higher when volatility is low and vice versa. However, the CLOB quote count is more responsive and introduces a lower average time period pre or before the midday data release compared to the standard deviation. When the price moves, the CLOB quote count responds immediately to a lower time period compared to a standard deviation model.

Embodiments of the present invention have been described. It will be appreciated that variations and modifications may be made to the described embodiments within the scope of the present invention.

The invention claimed is:
1. A system comprising:
    a plurality of client computers coupled with a server by a computer network via which each of the client computers is configured to provide requests thereto;

the server comprising a memory for storing requests received from the plurality of client computers, the server being configured to:
  calculate, dynamically, a post trade time interval based on a count of unique requests received by the server;
  match any complementary requests received from the plurality of client computers stored in the memory;
  upon a match of complementary requests, count unmatched requests received during the calculated post trade time interval subsequent to the match which correspond to any of the matched complementary requests in the memory, and output the counted number of unmatched requests as an indication of activity in the system; and
  execute a transaction between the matched complementary requests at a value computed based on the counted number of unmatched requests.

2. The system of claim 1, wherein the requests are provided in XML format.

3. The system of claim 1, wherein complementary requests are matched by time priority provided by the plurality of client computers.

4. The system of claim 1, wherein each of the provided requests is associated with one of a plurality of products, the calculated post trade time interval being different for different products of the plurality of products.

5. The system of claim 4 wherein each of the plurality of products comprises a currency pair.

6. The system of claim 1, wherein the count of unique requests received by the server is indicative of market activity and volatility.

7. An apparatus comprising:
  a memory for storing requests received from a plurality of client computers via a network, and
  the apparatus being configured to:
    calculate, dynamically, a post trade time interval based on a count of received unique requests;
    match any complementary requests from the plurality of client computers stored in the memory and upon a match, count a number of unmatched requests corresponding to any of the matched complementary requests that are stored in the memory and were received during the calculated post trade time interval subsequent to the match, and output the counted number of unmatched requests as an indication of activity; and
    execute a transaction between the matched complementary requests at a value computed based on the counted number of unmatched requests.

8. The apparatus of claim 7, wherein the requests are provided in XML format.

9. The apparatus of claim 7, wherein complementary requests are matched by time priority provided by the plurality of client computers.

10. The apparatus of claim 7, wherein each of the provided requests is associated with one of a plurality of products, the calculated post trade time interval being different for different products of the plurality of products.

11. The apparatus of claim 10, wherein each of the plurality of products comprises a currency pair.

12. A computer implemented method comprising:
  receiving, by a sever, requests via a computer network from a plurality of client computers coupled therewith;
  storing, by the server, the received requests in a memory coupled therewith;
  calculating, dynamically by the server, a post trade time interval based on a count of unique requests received by the server;
  matching any complementary requests received from the plurality of client computers which are stored in the memory;
  counting, by the server upon a match, a number of unmatched requests corresponding to any of the matched complementary requests stored in the memory which were received during the calculated post trade time interval subsequent to the match;
  outputting, by the server, the counted number of unmatched requests as an indication of activity; and
  executing, by the server, a transaction between the matched complementary requests at a value computed based on the counted number of unmatched requests.

13. The computer implemented method of claim 12, wherein the requests are provided in XML format.

14. The computer implemented method of claim 12, wherein the server matching complementary requests comprises the server matching complementary requests by time priority provided by the plurality of client computers.

15. The computer implemented method of claim 12, wherein each of the provided requests is associated with one of a plurality of products, the calculated post trade interval being different for different products of the plurality of products.

16. The computer implemented method of claim 15, wherein each of the plurality of products comprises a currency pair.

17. The computer implemented method of claim 12, wherein the count of unique requests received by the server is indicative of market activity and volatility.

18. A non-transitory computer readable medium comprising instructions executable by a processor which, when executed by the processor, cause the processor to:
  receive requests from a plurality of client computers over a computer network via which each of the client computers is configured to provide requests;
  store the requests provided by the plurality of client computers in a memory;
  calculate, dynamically, a post trade time interval based on a count of received unique requests;
  match any complementary requests received from the plurality of client computers stored in the memory;
  upon a match of any complementary requests, count unmatched requests corresponding to any of the matched complementary requests that are stored in the memory and were received during the calculated post trade time interval subsequent to the match;
  output the counted number of unmatched requests as an indication of activity; and
  execute a transaction between the matched complementary requests at a value computed based on the counted number of unmatched requests.

19. The non-transitory computer readable medium of claim 18, wherein the requests are provided in XML format.

20. The non-transitory computer readable medium of claim 18, wherein the match of any complementary requests comprises a match by time priority provided by the plurality of client computers.

21. The non-transitory computer readable medium of claim 18, wherein each of the provided requests is associated with one of a plurality of products, the calculated post trade time interval being different for different products of the plurality of products.

22. The non-transitory computer readable medium of claim 21, wherein each of the plurality of products comprises a currency pair.

23. The non-transitory computer readable medium of claim 18, wherein the count of unique requests received by the server is indicative of market activity and volatility.

* * * * *